3,144,604
TRANSISTOR THERMAL IMPEDANCE TEST SET EMPLOYING A BRIDGING TYPE MERCURY RELAY
Grant F. Stetzler, Temple, Pa., assignor to Western Electric Company, Incorporated, New York, N.Y., a corporation of New York
Filed June 27, 1960, Ser. No. 39,189
7 Claims. (Cl. 324—158)

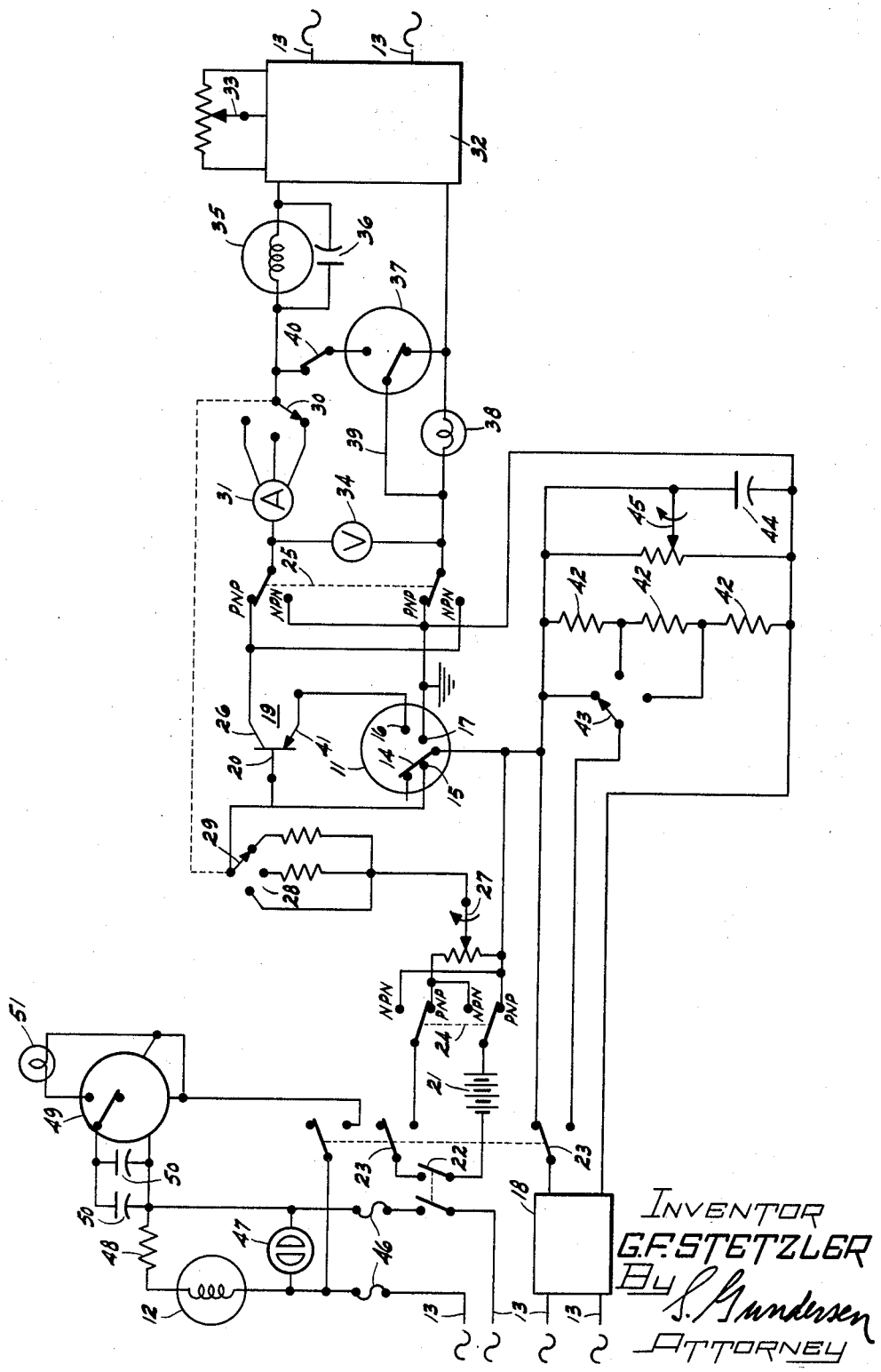

This invention relates to semiconductor test systems and particularly to systems for determining the thermal impedance of transistors.

With the development of increased understanding of the properties and techniques of manufacture of semiconductive electronic devices, a factor which during the less sophisticated stages of the technology was considered significant only in connection with transistor power amplifiers is now found also to be important for small signal devices. This factor is thermal impedance or the increase in temperature of a junction (between semiconductive material of opposite conductivities) caused by the dissipation of a specified amount of D.C. power. The transistor parameter most easily related to thermal impedance is the collector-base leakage current with open emitter $I_{CBO}$. Determination of $I_{CBO}$ is indicative of the thermal impedance since, for most transistors, the $I_{CBO}$ approximately doubles for each ten degrees centigrade change in junction temperature.

Control of thermal impedance is becoming a matter of increased concern in large scale transistor manufacture. In high power dissipating devices, an excessive value of thermal impedance may well result in the phenomenon of thermal run-away and possible destruction of the transistor. In small signal devices, the consequences of regenerative heating is an increase in collector leakage current with a consequent increase in transistor temperature which can significantly affect performance. The wide spread application of thermal impedance testing urges towards the development of inexpensive test devices and techniques which minimize the cost factors of equipment and labor. Difficulties attend efforts to simplify. The $I_{CBO}$ must be measured very soon after biasing power has been applied to the transistor, for the thermal effects dissipate quickly. Opposing the rapid measurement of $I_{CBO}$ is the necessity to open the emitter circuit, remove power from the base, and provide carrier sweeping action in the junction zone before the measurement is taken so that the measurement will reflect only the collector leakage current. In prior art test devices developed primarily for laboratory use, these requirements inevitably lead to rather clumsy circuitry involving a multiplicity of relays and trigger circuits and a complicated test procedure.

It is an object of the present invention to provide a simple circuit for determining the leakage collector to base current of a transistor with the emitter open for the determination of thermal impedance.

A further object of the invention is to provide a test set for determining change in collector-base current with the emitter open.

Accordingly, the invention provides a transistor thermal impedance test set utilizing a single bridging type mercury relay, i.e., a relay having mercury-wetting contacts which short circuit momentarily when the relay is actuated. One side of a base bias supply is connected to the base of a transistor under test and to a first contact of the relay. One side of a collector bias supply is connected to the collector, and the other side of the collector bias supply is connected to a second relay contact and to ground. The emitter is connected to a third relay contact. The relay armature is connected to the other side of the base bias supply and to an alternating current sensitive meter the other side of which is connected to ground. The relay armature is caused to transfer between the first contact and the second and third contacts. When the relay armature is at the second and third contacts, biasing power is applied to the transistor to cause heating thereof. When the relay armature is at the first contact, the transistor emitter is open and the collector bias supply, in series with the meter, is connected between the base and the collector of the transistor to measure $I_{CBO}$. During the transfer the armature momentarily short circuits the three contacts together by virtue of the action of the mercury-wetted contact surfaces, permitting the carriers to be swept out of the junction zone while the meter input is grounded so that the measurement will reflect only $I_{CBO}$.

The invention is described in connection with the drawing which illustrates a transistor thermal impedance test set according to the invention.

The circuit shown in the drawing utilizes a conventional mercury relay 11 with a solenoid operating coil 12 energized by a supply of alternating current 13, As a practical matter the alternating current source may be of the normal 115-volt, 60-cycle per minute variety. The instantaneous potential across the coil follows a sine curve and the armature 14 of the relay transfers from contact 15 to spaced-apart contacts 16 and 17 whenever the potential across coil 12 is of a prescribed magnitude of either positive or negative polarity. The relay releases, that is, the armature 14 returns to contact 15 when the magnitude of the voltage across the coil is reduced below the operating values.

In conventional mercury contact relays, the armature and contacts are covered with mercury and are usually enclosed in a glass tube in an inert atmosphere, the contacts being supplied with mercury through capillary action from a mercury pool or reservoir. A phenomenon of mercury contact relays, of the type from which relay 11 is selected, is that at practical operating rates there will be a short period, for example, between 100 and 1,000 micro-seconds, during which all contacts and the armature will be physically and electrically connected, or bunched, together by liquid mercury bridging across the contacts. This characteristic of the mercury relay is utilized in the present invention to provide an extremely simple circuit and permit the elimination of the complex switching and trigger circuitry characteristic of prior art thermal impedance test sets. The relay in addition to providing carrier sweeping and circuit switching actions provides chopping of the D.C. collector-base current permitting use of a highly sensitive and quickly responsive alternating current meter of the vaccum tube voltmeter type.

Transistor 19 being tested is connected during the power input portion of the test cycle in a common emitter configuration. Base bias current is provided to the base 20 from base bias potential source 21 which is, in this case, a 45-volt battery. A double-throw, double-pole power switch 22 has one pole in the bias circuit and another in the power input circuit which operates relay coil 12. Another switch 23, in series with the base bias power supply, ganged with switches in the A.C. input circuit and the input circuit of a vacuum tube voltmeter 18, is designated the "decibel zero-test" switch. Switch 23 functions in establishing the $I_{CBO}$ change as will be described more fully below.

Polarity reversing switch 24, which may be operated in conjunction with polarity reversing collector bias circuit switch 25, provides the proper bias polarities for PNP and NPN transistors under test. In the present case, transistor 19 is of the PNP type. Polarity switch 24 is, consequently, in its lower, PNP, position so that negative base bias appears at the base 20. Collector polarity switch 25 is in its upper position providing negative bias of a greater magnitude than the base bias to the collector 26. The collector-base junction is reversed bias as is necessary for the $I_{CBO}$ test. A variable voltage divider 27 is the base bias circuit is available to adjust the base bias to a proper value. Resistor bank 28 is operated by collector switch 29 which is ganged to collector switch 30. These switches 29 and 30 operate to insure that current meter 31 in the collector bias circuit operates in the correct range and is not overloaded.

Collector bias voltage is supplied by power supply 32 adjustable by external voltage adjustment 33 to the proper value for collector voltage for transistor 19 according to the reading on voltmeter 34. Overload protection against improper base bias or insertion of a test transistor is afforded by the combination of relay coil 35 in series with the collector bias supply, capacitor 36 across the relay coil, relay contacs 37 across the line, overload lamp 38 in series with the collector bias, and bypass 39 as shown in the drawing. Excessive collector current energizes the relay coil 35 to draw up the contacts 37, thereby removing collector bias voltage from the transistor 19 and lighting the overload lamp 38. Overload switch 40, in series with the relay contacts 37 across the collector bias supply, is used to de-energize the relay coil 35 when the cause of the excessive collector current is removed.

That side of the collector bias supply not connected to collector 26 is grounded through switch 25 and joined to contact 17 of relay 11. Emitter 41 is led to contact 16 on the same side of relay 11 so that armature 14 will make contacts 16 and 17 simultaneously on one side of its throw. As has been indicated above, contacts 16 and 17 will be disconnected when armature 14 throws to its opposite extreme position where it makes contact 15. During the transfer interval, as has been indicated, contacts 15, 16 and 17 as well as armature 14 will be electrically connected by virtue of the fluid action of the mercury-wetted contact surfaces.

The opposite side of the base bias supply from that connected to base 20 is connected to armature 14. Vacuum tube voltmeter 18 is also connected to armature 14 through "decibel zero-test" switch 23. An attenuator network consisting of resistors 42 and three-way switch 43 is placed across the vacuum tube voltmeter 18 to provide appropriate working ranges for a large variety of transistors. Potentiometer 45 and capacitor 44, also across the vacuum tube voltmeter 18, permit the setting of the voltmeter at an appropriate reference point during one of the steps in the thermal impedance test which will be described below.

Power for the actuation of relay 11 is provided to relay coil 12 by A.C. power supply 13. The usual on-off power switch 22, fuses 46 and neon power-on indicator 47 are provided in the relay coil power circuit. During operation of the test set the 60-cycle input throws relay 11 120 times per minute in an uninterrupted sequence. Load resistor 48 in series with relay coil 12 provides the proper voltage drop for the coil. Also operated directly from the input power supply is a timer circuit consisting of a timer relay 49, two capacitors 60 and indicator lamp 51. Indicator lamp 51 provides a visual time period indication for the operator of the test set for determining an appropriate interval during which an $I_{CBO}$ change occurs.

Operation of the test set will now be described. Preliminary adjustments are to be made prior to the actual test. It is to be understood, of course, that a transistor will be tested having operating characteristics within the capabilities of the test system and bias requirements which are predetermined. It will be evident that a number of the preliminary steps may be taken out of the order indicated. Power switch 22 is first turned on and the set allowed to warm up for approximately five minutes. Switches 24 and 25 are then set for the type of transistor, PNP or NPN, being tested. Switch 23 is placed in its upper or decibel zero position. Control potentiometer 45 should be turned to its maximum sensitivity position consistent with the full scale deflection of the vacuum tube voltmeter 18. Switches 29 and 30 are then adjusted at the lowest current range at which meter 31 is capable of measuring the specified collector current. The collector voltage adjustment 33 is set so that the specified collector voltage appears on voltmeter 34. Timer relay 49 is then set for the appropriate testing time and finally decibel scale switch 43 is switched to the lowest range capable of measuring the anticipated decibel rise. With the completion of these steps, the test set is ready for actual testing.

For testing, the transistor is inserted with collector, emitter, and base leads connected as shown in the drawing. Since switch 23 is open, there is no base bias on the transistor. Potentiometer 45 is then balanced so that vacuum tube voltmeter 18 reads zero decibels or a value related to the amount of attenuation introduced by resistors 42; in any case, the final reading will be the difference between this reference setting and the final reading.

The "decibel zero-test" switch 23 is then thrown to its test, or lower, position which applies base bias power through armature 14 to relay contacts 16 and 17. The collector bias is adjusted by means of potentiometer 27 to give the appropriate readings for the transistor type being tested on current meter 31 and voltmeter 34. An example of typical readings for a quarter watt rated transistor is from 30 to 40 milliamperes at 6 volts collector bias. After the passage of an appropriate time as indicated by the timer 49, $I_{CBO}$ will have increased sufficiently from the no base power condition to the base power condition to give an indication of the thermal impedance. This rise occurs as an exponential function, and it is not necessary, since the later portions of the increase occur extremely slowly, to wait for the full rise. Typically, approximate thermal equilibrium may be reached within from three to five minutes. For example, in one case, when the total $I_{CBO}$ change was 24 decibels, a 23½ decibel rise occurred in the first three minutes, while an additional change of only ½ decibel occurred in the succeeding fifteen minutes.

The switching action of relay 11 during the test period is as follows. When armature 14 makes contact with base contact 15, emitter 41 is open as required for the $I_{CBO}$ measurement. The base bias supply is shunted through contact 15 and armature 14 so that no base bias appears on the base 20. When armature 14 is thrown to the right, contacts 16 and 17 are made, and D.C. bias power is applied in the common emitter configuration. In this condition, the emitter and vacuum tube voltmeter input are grounded. Grounding of the vacuum tube voltmeter is necessary to prevent the high collector current present during the power on and early sweep periods from being reflected in the measurement of $I_{CBO}$. During the transfer time of approximately 0.5 millisecond, all the contacts 15, 16, 17 and armature 14 are shorted together. In this fraction of a millisecond, the base power is again shunted around the transistor to cut off the D.C. power which was being consumed. This allows time for the carriers in the base-collector junction area, which would otherwise influence the $I_{CBO}$ reading, to be swept out while the vacuum tube voltmeter input is still grounded. The switching action of armature 14 chops the D.C. collector-base current producing proportional A.C. pulses measurable by the vacuum tube voltmeter. The efficacy of these pulses is, of course, dependent upon the time and frequency sensitivity of the vacuum tube voltmeter, and this determines the operating characteritsics of relay 11 which in turn limits the frequency of the alternating input power.

The arrangement and its operation as described above are simply illustrative of the invention. Other applications and variations in circuitry will occur to those versed in the art which will embody the principles of the invention and fall within its spirit and scope.

What is claimed is:

1. A transistor thermal impedance test set comprising in combination a relay having mercury-wetted contacts which momentarily physically and electrically join together when the relay is actuated, means for applying base bias to the transistor under test, one side of said base bias means being connected to a first contact of the relay and to the transistor base, means for applying collector bias to the transistor, one side of said collector bias means being connected to the transistor collector and the other side thereof being connected to ground, a second contact of the relay connected to the transistor emitter, a third contact of the relay connected to ground, a fourth contact of the relay being the armature contact connected to the other side of the base bias means, a current measuring device having one side connected to said relay armature and the other side connected to ground, and means for transferring the relay armature between the first relay contact and the second and third relay contacts.

2. A test set according to claim 1 in which the current measuring device includes a vacuum tube voltmeter.

3. A test set according to claim 1 in which the means for applying the base bias includes switching means for disconnecting the base bias means from the base.

4. A transistor thermal impedance test set which comprises a relay having mercury-wetted contacts which momentarily physically and electrically join together upon actuation of the relay armature, a base bias supply, one side of the base bias supply being connected to the relay armature, means for connecting the other side of said base bias supply to the base of a transistor under test, a first of the relay contacts connected to the transistor base, means for connecting a second of the relay contacts to the transistor emitter, a collector bias supply means for connecting one side of the collector bias supply to the transistor collector, means for connecting the other side of said collector bias supply to a third relay contact, an alternating current sensitive meter having one side connected to the relay armature and the other side connected to the third relay contact, and armature actuating means for transferring the armature between the first contact and the second and third contacts.

5. A test set according to claim 4 in which the output leads of the respective bias supplies are reversible.

6. A test set according to claim 4 in which the collector bias supply comprises overload protective means for bypassing excessive collector bias current.

7. A test set according to claim 4 in which the base bias supply comprises switching means for opening the base bias supply, and adjustable means is connected across the meter for bringing the meter to a reference when the base bias supply is open.

References Cited in the file of this patent
UNITED STATES PATENTS
2,872,644     Reich _____ Feb. 3, 1959

OTHER REFERENCES

Measurement of Thermal Resistance, article in Proceedings of the I.R.E., June 1958, pp. 1204–1208.